(12) United States Patent
Cho et al.

(10) Patent No.: US 12,191,462 B2
(45) Date of Patent: Jan. 7, 2025

(54) BATTERY MODULE AND METHOD OF MANUFACTURING THE SAME

(71) Applicant: LG Chem, Ltd., Seoul (KR)

(72) Inventors: Yongjin Cho, Daejeon (KR); Junyeob Seong, Daejeon (KR); Jinwoo Park, Daejeon (KR); Tae Geun Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 912 days.

(21) Appl. No.: 17/267,673

(22) PCT Filed: Feb. 20, 2020

(86) PCT No.: PCT/KR2020/002470
§ 371 (c)(1),
(2) Date: Feb. 10, 2021

(87) PCT Pub. No.: WO2020/171626
PCT Pub. Date: Aug. 27, 2020

(65) Prior Publication Data
US 2021/0313631 A1    Oct. 7, 2021

(30) Foreign Application Priority Data

Feb. 21, 2019 (KR) .......................... 10-2019-0020507

(51) Int. Cl.
*H01M 10/48* (2006.01)
*G01N 23/046* (2018.01)
(Continued)

(52) U.S. Cl.
CPC ........ *H01M 10/488* (2013.01); *G01N 23/046* (2013.01); *H01M 10/4285* (2013.01);
(Continued)

(58) Field of Classification Search
None
See application file for complete search history.

(56) References Cited

U.S. PATENT DOCUMENTS

| 10,601,089 B2 | 3/2020 | Lee et al. |
| 10,777,860 B2 | 9/2020 | Jo et al. |

(Continued)

FOREIGN PATENT DOCUMENTS

| CN | 1886851 A | 12/2006 |
| CN | 102906916 A | 1/2013 |

(Continued)

OTHER PUBLICATIONS

Stephens, S.E., Ingels, N.B., Wenk, J.F. et al. Alumina as a Computed Tomography Soft Material and Tissue Fiducial Marker. Exp Mech 62, 879-884 (2022). https://doi.org/10.1007/s11340-022-00825-x (Year: 2022).*

(Continued)

*Primary Examiner* — Robert S Carrico
(74) *Attorney, Agent, or Firm* — Lerner David LLP (57) ABSTRACT

A battery module includes: a module frame including a lower plate and a side wall defining an internal space; a battery cell stack disposed in the internal space of the module frame and including a plurality of battery cells that are stacked to be adjacent to each other side by side; and a resin layer disposed between the lower plate and the battery cell stack and including a detection agent, wherein the lower plate includes at least one injection hole.

8 Claims, 8 Drawing Sheets

(51) Int. Cl.
  *H01M 10/42*    (2006.01)
  *H01M 10/653*   (2014.01)
  *H01M 50/211*   (2021.01)
  *H01M 50/224*   (2021.01)
  *H01M 50/227*   (2021.01)
  *H01M 50/229*   (2021.01)
  *H01M 50/231*   (2021.01)
  *H01M 50/233*   (2021.01)

(52) U.S. Cl.
  CPC ......... *H01M 10/48* (2013.01); *H01M 10/653* (2015.04); *H01M 50/211* (2021.01); *H01M 50/224* (2021.01); *H01M 50/227* (2021.01); *H01M 50/229* (2021.01); *H01M 50/231* (2021.01); *H01M 50/233* (2021.01); *G01N 2223/419* (2013.01)

(56) References Cited

U.S. PATENT DOCUMENTS

| | | | |
|---|---|---|---|
| 2009/0317710 A1* | 12/2009 | Douglas | H01M 4/663 977/773 |
| 2010/0035130 A1 | 2/2010 | Palanisamy et al. | |
| 2011/0250495 A1 | 10/2011 | Webber et al. | |
| 2016/0126523 A1 | 5/2016 | Arena et al. | |
| 2017/0047559 A1 | 2/2017 | Yoo et al. | |
| 2018/0076493 A1 | 3/2018 | Park et al. | |
| 2018/0205124 A1 | 7/2018 | Lee et al. | |
| 2018/0304504 A1 | 10/2018 | Lee | |
| 2019/0044201 A1 | 2/2019 | Jo et al. | |
| 2019/0348725 A1 | 11/2019 | Golubkov | |
| 2020/0251789 A1 | 8/2020 | Park et al. | |
| 2020/0373634 A1* | 11/2020 | Choi | H01M 10/613 |

FOREIGN PATENT DOCUMENTS

| | | | |
|---|---|---|---|
| CN | 106062996 A | | 10/2016 |
| CN | 107431147 A | | 12/2017 |
| CN | 110380124 A | * | 10/2019 |
| EP | 3570363 A1 | | 11/2019 |
| EP | 3588663 A1 | | 1/2020 |
| EP | 3678212 A1 | | 7/2020 |
| EP | 3716393 A1 | | 9/2020 |
| JP | 2013037794 A | | 2/2013 |
| JP | 2016197572 A | | 11/2016 |
| JP | 2017-141188 A | | 8/2017 |
| JP | 2018-510463 A | | 4/2018 |
| KR | 20160105354 A | | 9/2016 |
| KR | 20160125644 A | | 11/2016 |
| KR | 20170059979 A | | 5/2017 |
| KR | 20170092246 A | | 8/2017 |
| KR | 20170107792 A | | 9/2017 |
| KR | 20180039453 A | | 4/2018 |
| KR | 20180060997 A | | 6/2018 |
| WO | 2019013508 A1 | | 1/2019 |

OTHER PUBLICATIONS

Search Report dated Aug. 25, 2023 from the Office Action for Chinese Application No. 202080004570.1 issued Aug. 26, 2023, pp. 1-2. [See p. 1, categorizing the cited references].
Extended European Search Report for Application No. 20759356.7, dated Sep. 2, 2021, 10 pages.
International Search Report for PCT/KR2020/002470 mailed Jun. 8, 2020; 3 pages.
Search Report dated May 15, 2024 from the Office Action for Chinese Application No. 202080004570.1 issued May 17, 2024, pp. 1-2.
Electrolyte Distribution and discharge time-A combined study of X-ray tomography and electrical measurements of a commercially available lithium-ion capacitor F. Wieder et al. pp. 211-218, 53(30), The Electrochemical Society Oct. 6, 2013.
Shuzi Zhenjiuxue Gailun, "Basic principle of CT imaging and related outputs", retrieved on Sep. 9, 2024. 13 pgs. (English Abstract Only).
Search Report dated Sep. 9, 2024 from Chinese Office Action for Application No. 202080004570.1 issued Sep. 25, 2024. 2 pgs. (see p. 1-2, categorizing the cited references).

* cited by examiner

PRIOR ART

FIG. 7

BATTERY MODULE AND METHOD OF MANUFACTURING THE SAME

CROSS-REFERENCE TO RELATED APPLICATIONS

This application is a national phase entry under 35 U.S.C. § 371 of International Application No. PCT/KR2020/002470, filed on Feb. 20, 2020, published in Korean, which claims priority to and the benefit of Korean Patent Application No. 10-2019-0020507 filed Feb. 21, 2019 in the Korean Intellectual Property Office, the entire contents of both of which are incorporated herein by reference.

TECHNICAL FIELD

The present invention relates to a battery module and a manufacturing method thereof, and more particularly, to a battery module and a manufacturing method thereof, capable of easily monitoring resin injection into the battery module.

BACKGROUND ART

With technology development and a demand for mobile devices, demand for rechargeable batteries as an energy source has been rapidly increasing. Accordingly, much research on rechargeable batteries that may meet various demands has been conducted.

A rechargeable battery has attracted considerable attention as an energy source for power-driven devices such as an electric bicycle, an electric vehicle, and a hybrid electric vehicle, as well as an energy source for mobile devices such as a cellular phone, a digital camera, and a laptop computer.

A small-sized device such as a cellular phone or a camera uses a small-sized battery pack in which one battery cell is packed, but a mid- or large-sized device such as a laptop computer or an electric vehicle uses a mid- or large-sized battery pack in which a plurality of battery modules including two or more battery cells connected to each other in parallel and/or in series are packed. Therefore, a number of battery cells included in the battery pack may be variously set depending on a required output voltage, or charge and discharge capacity.

On the other hand, when a battery pack is configured by connecting a plurality of battery cells in series or parallel, a usual method is a method of configuring a battery pack by first configuring a battery module made of at least one battery cell and adding other components using the at least one battery module.

In the case of such a battery module, importance of a technique capable of efficiently cooling heat generated in a battery cell is gradually increasing as required battery capacity increases. To this end, a structure capable of improving thermal conductivity by applying a resin for heat dissipation to an interior of a case in the battery module is introduced.

However, when a resin is injected through an injection port from the battery module into the case, it is difficult to determine an injection amount, and thus when insufficient resin is injected, the resin is not evenly distributed inside the case, or too much resin is injected and unnecessary waste occurs, and a separate process is required to remove the wasted resin.

DISCLOSURE

Technical Problem

The present invention has been made in an effort to provide a battery module and a manufacturing method thereof, capable of preventing a resin from leaking through a detection hole or the like and effectively monitoring a state of an injected resin within the module.

However, the problem to be solved by the exemplary embodiments of the present invention is not limited to the above-described problem, and can be variously extended within the scope of the technical spirit included in the present invention.

Technical Solution

An exemplary embodiment of the present invention provides a battery module including: a module frame including a lower plate and a side wall defining an internal space; a battery cell stack disposed in the internal space of the module frame and including a plurality of battery cells that are stacked to be adjacent to each other side by side; and a resin layer disposed between the lower plate and the battery cell stack and including a detection agent, wherein the lower plate includes at least one injection hole.

The resin layer may include a thermally conductive resin.

The detection agent may be a contrast agent.

The contrast agent may be comprised of a plurality of particles.

The detection agent may be a coloring material, and the lower plate may include at least one transparent window that is spaced from the at least one injection hole.

The coloring material may be pigment particles.

The at least one transparent window may have at least one detection hole formed in the lower plate and a transparent tape attached to an outer surface of the lower plate to correspond to the at least one detection hole.

The at least one transparent window may be spaced apart from the at least one injection hole along a longitudinal direction of the lower plate.

The resin layer may contact the transparent tape.

An exemplary embodiment of the present invention provides a method of manufacturing a battery module, including: accommodating a battery cell stack in which a plurality of battery cells are stacked to be adjacent to each other side by side in a module frame; injecting a resin composition containing a detection agent between the battery cell stack and a lower plate of the module frame through at least one injection hole formed in the lower plate; and stopping injection of the resin composition through the at least one injection hole when the resin composition is distributed over the entire area of the lower plate by monitoring a flow of the resin composition containing the detection agent.

The detection agent is a contrast agent, and the monitoring may be performed by computer tomography.

The contrast agent may be comprised of a plurality of particles.

The detection agent may be a coloring material, and the lower plate may include at least one transparent window that is spaced from the at least one injection hole.

The monitoring may be performed by monitoring a color change of the transparent window using a color difference meter.

An exemplary embodiment of the present invention provides a battery pack including: at least one battery module according to the foregoing; and a pack case for packaging the at least one battery module.

An exemplary embodiment of the present invention provides a device including at least one battery pack according to the foregoing.

Advantageous Effects

According to the exemplary embodiments, it is possible to provide a battery module and a manufacturing method thereof, capable of preventing a resin from leaking through a detection hole or the like and effectively monitoring a state of an injected resin within the module.

MODE FOR INVENTION

The present invention will be described more fully hereinafter with reference to the accompanying drawings, in which exemplary embodiments of the invention are shown. As those skilled in the art will realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

Figure 1:
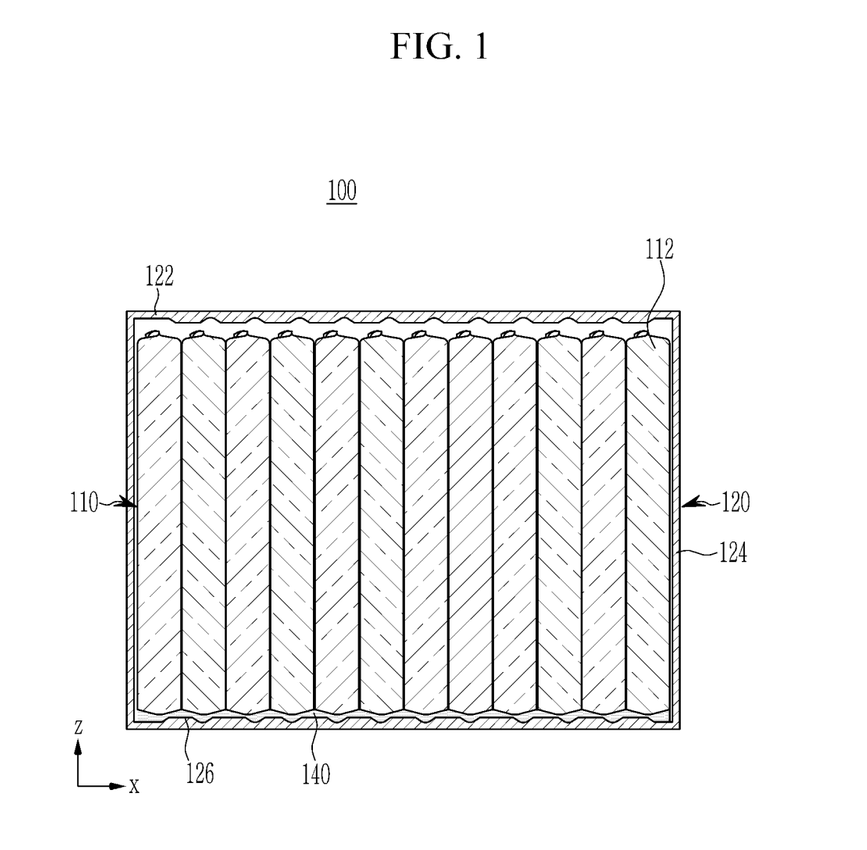
FIG. 1 illustrates a cross-section of a battery module according to an exemplary embodiment of the present invention.
Figure 2:
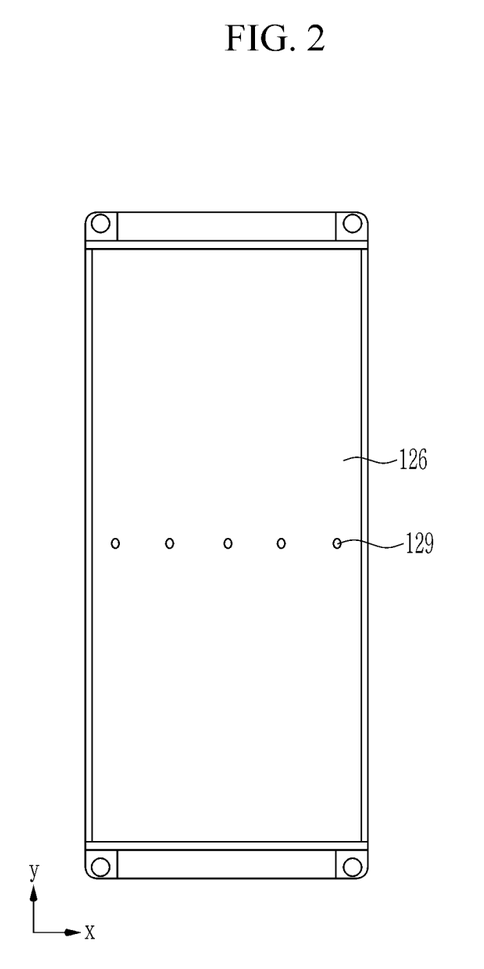
FIG. 2 illustrates a state viewed from a side of a lower plate in a battery module according to an exemplary embodiment of the present invention.
Figure 3:
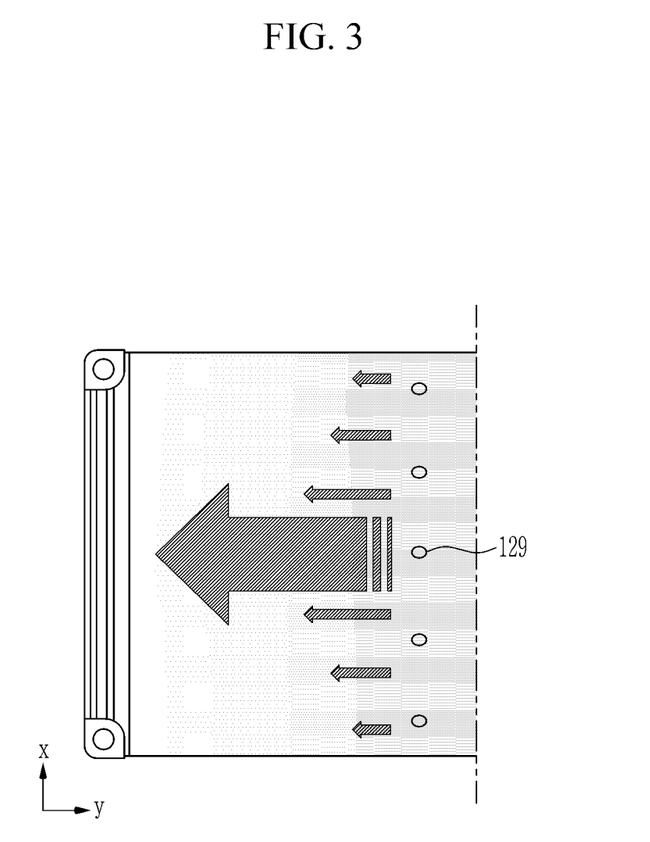
FIG. 3 illustrates a view for describing a flow of a resin according to an example of the present invention.

FIG. 1 illustrates a cross-section of a battery module according to an exemplary embodiment of the present invention, FIG. 2 illustrates a state viewed from a side of a lower plate in a battery module according to an exemplary embodiment of the present invention, and FIG. 3 illustrates a view for describing a flow of a resin according to an example of the present invention.

Referring to FIG. 1, the battery module 100 according to the exemplary embodiment of the present invention is configured to include a battery cell stack 110 in which a plurality of battery cells 112 are stacked to be adjacent to each other side by side and a module frame 120 in which the battery cell stack 110 is accommodated.

The battery cell stack 110 is an aggregate of rechargeable batteries including a plurality of battery cells 112. The battery cell stack 110 may include the plurality of battery cells 112, and each of the battery cells includes an electrode lead (not illustrated). The battery cells 112 may be stacked and connected using the electrode leads to constitute the battery cell stack 110. The battery cell 112 may be a pouch-type battery cell having a plate-like shape, but the present invention is not limited in addition. The electrode lead is a positive electrode lead or a negative electrode lead, and an end portion of the electrode lead of each of the battery cells 112 may be bent in a direction such that it may contact ends of the electrode leads of the adjacent battery cells 112. The two electrode leads in contact with each other may be fixed to each other by welding or the like, and accordingly, electrical connection between the battery cells 112 within the battery cell stack 110 may be made.

The battery cells 112 are vertically stacked such that the electrode leads are aligned in a direction to constitute the battery cell stack 110. The battery cell stack 110 is accommodated in a module frame 120 including a lower plate 126 and a pair of side walls 124 constituting an internal space. For example, the module frame 120 may include an upper plate 122 and the lower plate 126, which are perpendicular to a stacked surface of the battery cell stack 110, and the pair of side walls 124 that are in parallel with the stacked surface of the battery cell stack 110 to connect the lower plate 122 and the upper plate 126. The battery cell stack 110 may be surrounded by the upper plate 122, the lower plate 126, and the pair of side walls 124, and the electrode leads of the battery cell stack 110 may be accommodated to be exposed by at least one opening (not illustrated) formed in the module frame 120. In this case, the opening may be covered by an end plate (not illustrated) including a configuration for electrically connecting the electrode leads to the outside.

Referring to FIG. 2, at least one injection hole 129 capable of injecting a resin for forming the resin layer 140 to be described later is formed in the lower plate 126 of the module frame 120. That is, in a state in which the battery cell stack 110 is accommodated in the module frame 120, the battery module 100 is disposed such that the lower plate 126 is upward, and a resin is injected through the injection hole 129 of the lower plate 126. A detailed description thereof will be described later.

The resin layer 140 may exist in a state of filling a space between the lower plate 126 of the module frame 120 and the battery cell stack 110.

The resin layer 140, which is a thermally conductive a resin layer, may include a thermally conductive resin and a detection agent dispersed therein.

The thermally conductive resin includes at least one of an acrylic resin, an epoxy resin, a urethane resin, an olefin resin, an EVA resin, and a silicone resin.

In the present exemplary embodiment, the detection agent includes a contrast agent. The contrast agent, which is a component included to monitor an injection state of a resin composition in a method of manufacturing the battery module 100 to be described later, may have a characteristic that it absorbs X-rays such that a flow of the resin may be seen as an image during computer tomography (CT).

Since the injection state of the resin composition is monitored by using the contrast agent, a separate detection hole for checking the injection of the resin composition is not required. That is, as illustrated in FIG. 2, at least one injection hole 129 is formed in the lower plate 126 according to the present exemplary embodiment, and no detection hole is formed. Since the detection hole is not formed, when the resin composition is injected, the resin composition is not wasted because an over-injected resin composition does not leak through the detection hole, or a separate process for removing the leaked resin composition may not need to be performed. In addition, even when no detection hole is formed, monitoring using a contrast agent is possible, so that a resin composition may be uniformly injected into an entire area corresponding to the lower plate 126 inside the module frame 120.

A particle type of material may be used as the contrast agent. For example, a compound or a complex containing a metal such as lead, barium, or gadolinium may be used, but the present invention is not particularly limited, and may be used as long as it has a characteristic that absorbs X-rays to be detectable. However, the material included in the battery module 100 may preferably be an insulator so as to not affect an operation of the battery cell or the like. The particles used as the contrast agent may have a particle diameter of about 0.001 μm to 80 μm.

When the resin layer 140 containing the contrast agent as a detection agent is formed, an injection level of the resin composition may be monitored in real time through computed tomography in a process of injecting the resin composition for forming the resin layer 140. Hereinafter, a manufacturing method of the battery module 100 including a process of monitoring injection of a resin composition will be described.

First, the plurality of battery cells 112 are stacked and connected by electrode leads to constitute the battery cell stack 110, and the battery cell stack 110 is accommodated inside the module frame 120. Next, an end plate is coupled to the opening of the module frame 120 to complete a battery module prior to injection of the resin composition.

Subsequently, the lower plate 126 of the module frame 120 is disposed to face upward, and the resin composition is injected through the injection hole 129 formed in the lower plate 126. The resin composition may include at least one of an acrylic resin composition, an epoxy resin composition, a urethane resin composition, an olefin resin composition, a urethane resin composition, an ethylene vinyl acetate (EVA) resin composition, and a silicone resin composition. Further, the resin composition includes a detection agent, and in the present exemplary embodiment, the detection agent includes a contrast agent.

In addition, the resin composition may include other additives capable of improving a characteristic of the resin layer and improving dispersion of the detection agent, for example, diluents, dispersants, surface treatment agents, flame retardants, coupling agents, and the like.

In this case, injection of the resin composition through the injection hole 129 is stopped when the resin composition is evenly diffused between the battery cell stack 110 and the lower plate 126, by monitoring a flow of the resin composition within the module frame 120 in real time while injecting the resin composition containing the contrast agent through the injection hole 129. Herein, the monitoring may be performed through computed tomography, but the present invention is not limited thereto, and is applicable to any non-destructive test capable of detecting a contrast agent. In this case, since the contrast agent is included in the resin composition, a diffusion form of the resin composition during computed tomography may be outputted as an image by photographing a contrast agent that absorbs X-rays, to be monitored. That is, as illustrated in FIG. 3, the resin composition injected through a plurality of injection holes 129 is diffused in a direction that is away from the injection holes 129 as the resin composition is continuously injected, but in the present exemplary embodiment, since the contrast agent is added into the resin composition and it is monitored by computed tomography, the diffusion state as in FIG. 3 may be checked in real time.

As such, it is possible to check in real time whether the resin composition is evenly distributed over the entire area corresponding to the lower plate 126 inside the module frame 120 and thus stop the injection of the resin composition by monitoring the flow and distribution of the resin composition inside the module frame 120 through the non-destructive test by adding the contrast agent into the resin composition. Accordingly, since it is not necessary to form a detection hole for monitoring, it is possible to achieve excellent cooling performance depending on the even distribution of the resin composition without allowing the resin composition to leak through the detection hole to waste a raw material or performing a separate process for removing the leaking resin composition.

Subsequently, the resin layer 140 is formed by curing the injected resin composition, thereby obtaining the battery module 100.

As described above, according to the present exemplary embodiment, it is possible to sufficiently inject the resin composition until the resin composition is uniformly dispersed throughout an entire interior of the lower plate 126 while preventing leakage of the resin composition by allowing the resin composition to contain a contrast agent, to be monitored in real time through the non-destructive test such as computed tomography, and to not have a separate detection hole in the process of injecting the resin composition for forming the resin layer 140 inside the module frame 120. Accordingly, it is possible to prevent the waste of a raw material resin composition due to a leakage of the resin composition and the occurrence of an additional process for removing it, and also, excellent cooling performance of the battery module 100 may be secured by uniformly injecting the resin composition into the module case 120.

In another exemplary embodiment of the present invention, descriptions of the same parts as those of the battery module and the manufacturing method according to the above-described exemplary embodiment will be omitted, and only differences will be described.

Figure 4:
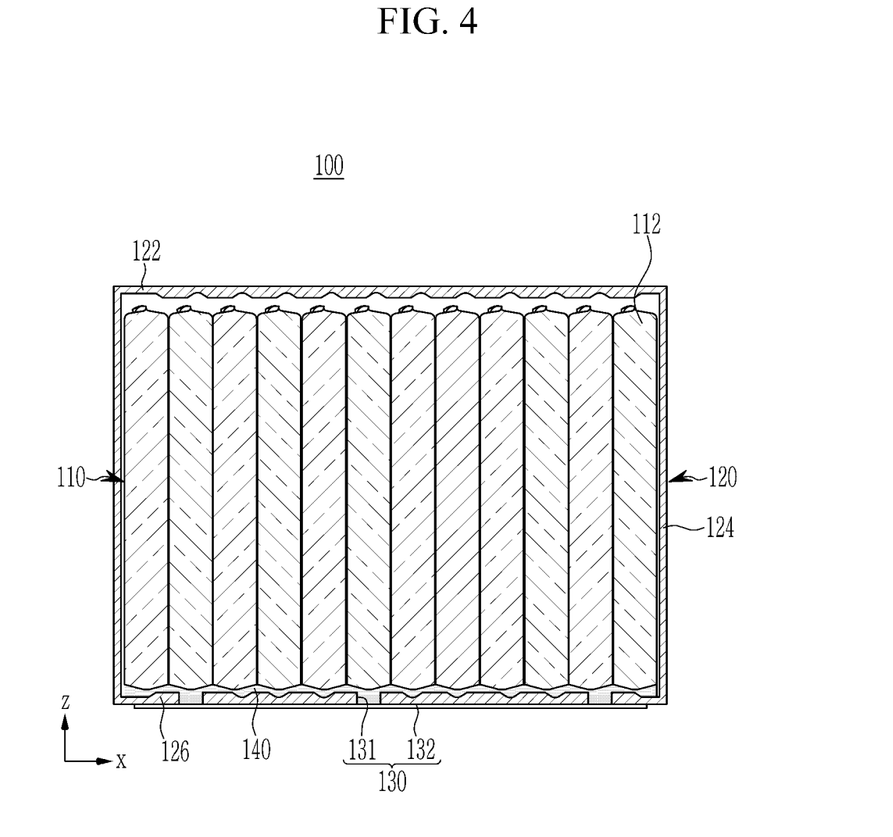
FIG. 4 illustrates a cross-section of a battery module according to another exemplary embodiment of the present invention.
Figure 5:
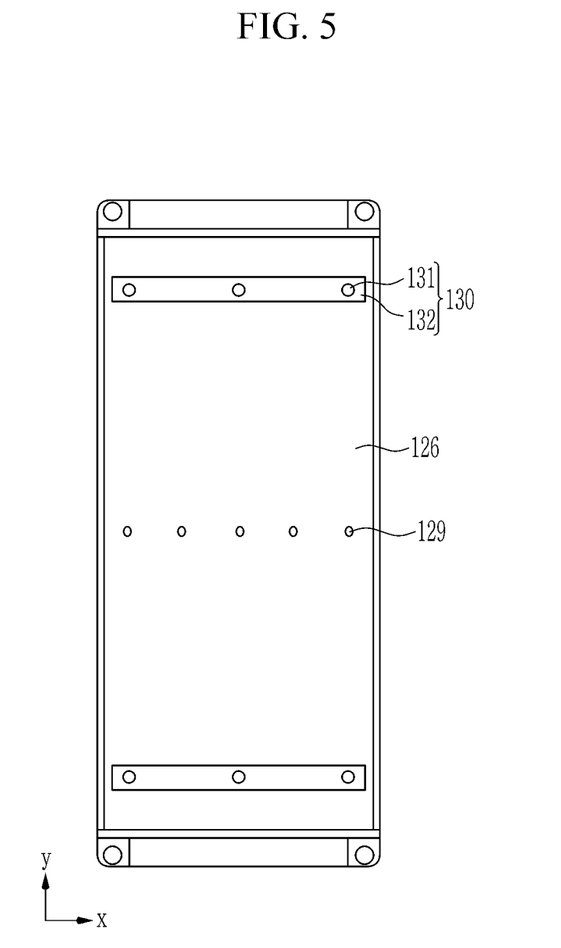
FIG. 5 illustrates a state viewed from a side of a lower plate in a battery module according to another exemplary embodiment of the present invention.
Figure 6A:
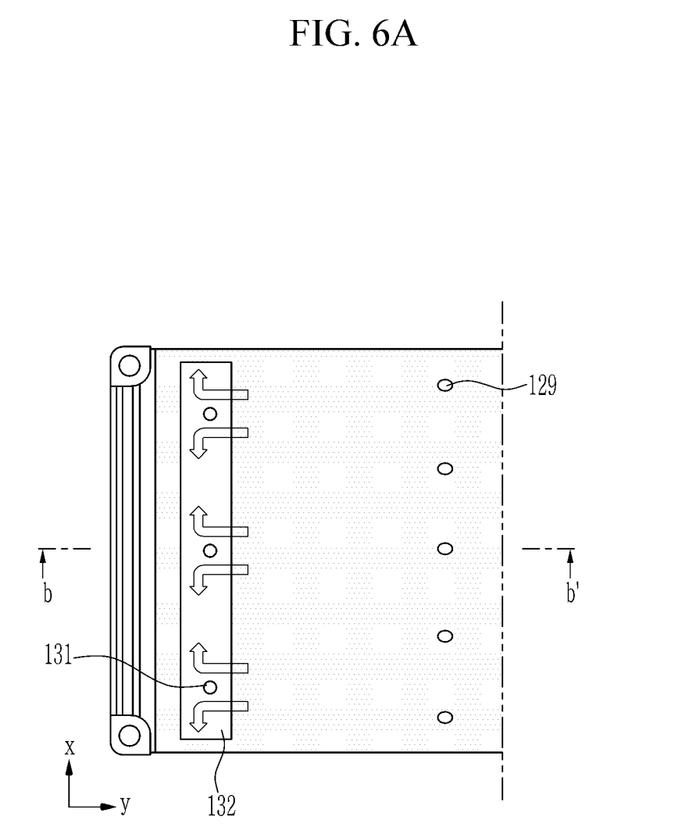
FIG. 6 illustrates a view for describing a flow of a resin according to another exemplary embodiment of the present invention.
Figure 6B:
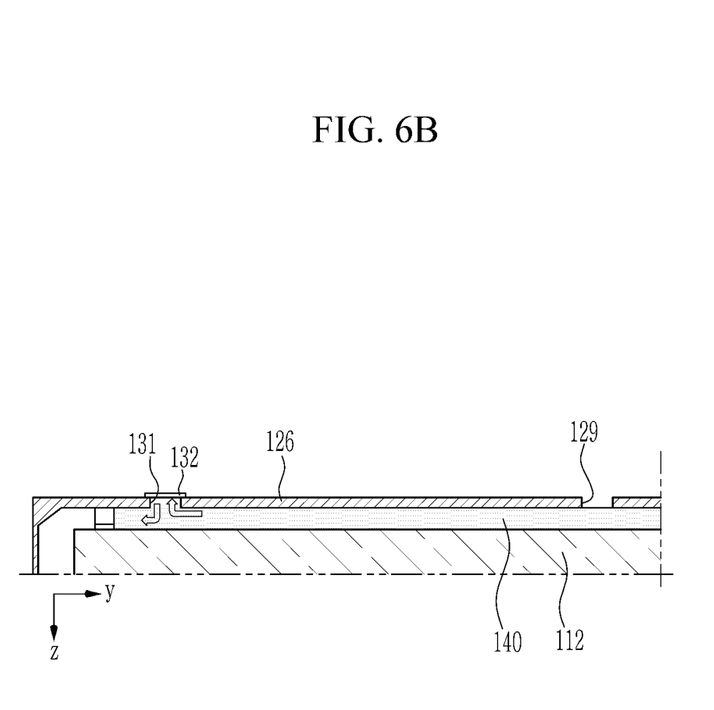
Figure 7:
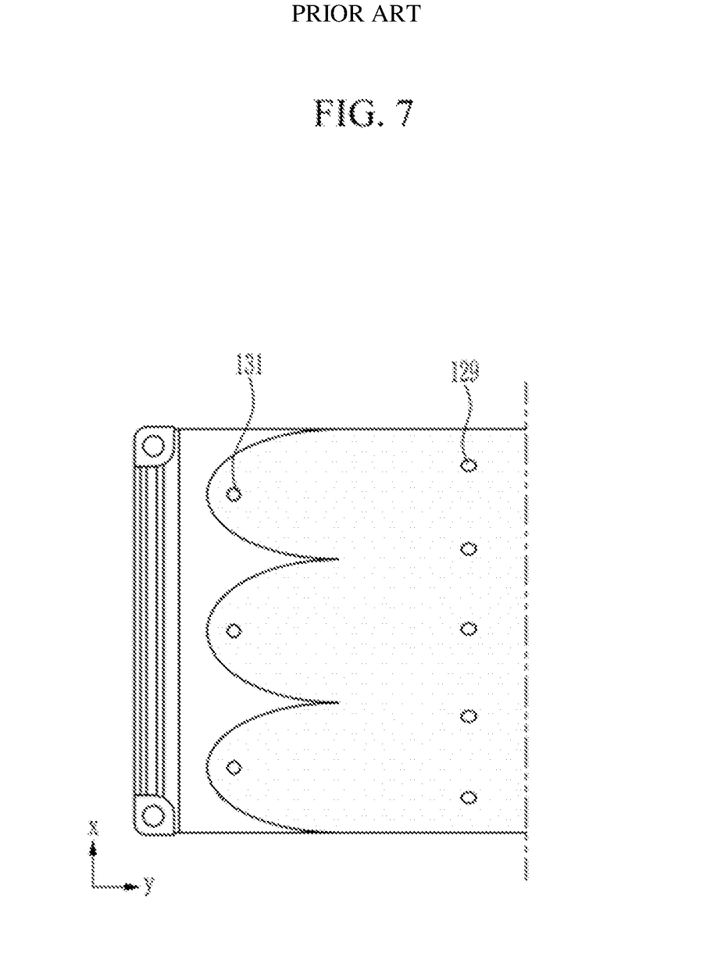
FIG. 7 illustrates a view for describing a flow of a resin according to comparative example.

FIG. 4 illustrates a cross-section of a battery module according to another exemplary embodiment of the present invention, FIG. 5 illustrates a state viewed from a side of a lower plate in a battery module according to another exemplary embodiment of the present invention, FIG. 6 illustrates a view for describing a flow of a resin according to another exemplary embodiment of the present invention, and FIG. 7 illustrates a view for describing a flow of a resin according to a comparative example.

As illustrated in FIG. 4 and FIG. 5, according to another exemplary embodiment of the present invention, the lower plate 126 includes at least one transparent window 130 that is spaced apart from the at least one injection hole 129. The transparent window 130 may be spaced from at least one injection hole 129 along a longitudinal direction of the lower plate 126 (that is, in an y-axis direction of FIG. 5), and may be positioned near opposite ends of the lower plate 126. For example, as illustrated in FIG. 5, a plurality of injection holes 129 may be arranged along a width direction (an x-axis direction of FIG. 5) of the lower plate 126 near a center of the lower plate 126 in a length direction, and at least one transparent window 130 may be positioned at positions that are spaced apart from each other along the length direction of the lower plate 126 from the injection holes 129 (i.e., in the y-axis direction of FIG. 5).

The transparent window 130 includes at least one detection hole 131 formed in the lower plate 126 and a transparent tape 132 attached to an outer surface of the lower plate 126 to correspond to the detection hole 131. The detection hole 131 is a hole formed in the lower plate 126 at a position of the transparent window 130, and the transparent tape 132 is attached in such a way so as to block the detection hole 131 from the outside. The transparent tape 132 is attached over a plurality of detection holes 131 in FIG. 5, but it may be formed as small pieces individually attached to correspond to each of the detection holes.

The transparent tape 132 may be a tape having an adhesive surface, it may be a combination of a double-sided tape and a transparent plate, and it may not be particularly limited as long as it has a shape that can block the detection hole 131 while the resin layer 140 can be observed.

In the present exemplary embodiment, the resin layer 140 contains a coloring material as a detection agent. The coloring material may be pigment particles, and is not particularly limited as long as it is a configuration that is visible from the outside through the transparent window 130. The pigment particles used as the coloring material may have a particle diameter of about 0.001 μm to 80 μm.

As such, a configuration of the transparent window 130 and the coloring material may be allowed to easily monitor the injection state of the resin composition during manufacture of the battery module 100, may be allowed to prevent the resin composition that is over-injected from leaking out of the detection hole 132, and may allow the resin composition to be uniformly diffused between the lower plate 126 and the battery cell assembly 110.

In addition, in the case of forming the resin layer 140 of the present exemplary embodiment, a distribution status of the resin composition may be monitored quickly and more accurately by observing a color change of the transparent window 130 through a color difference meter in a process of injecting the resin composition for forming the resin layer 140. That is, in injecting the resin composition through the injection hole 129 formed in the lower plate 126, since the resin composition contains a coloring material as a detection agent, when the resin composition reaches the transparent window 130, a change thereof may be more easily derived.

In addition, in the present exemplary embodiment, since the detection hole 131 is blocked by the transparent tape 132, as described above, the resin composition may be prevented from leaking out of the detection hole 132, and the resin composition may be uniformly diffused between the lower plate 126 and the battery cell assembly 110. As illustrated in FIG. 6, the resin composition injected through the injection hole 129 is diffused toward an end portion of the lower plate 126, when it reaches a position of the detection hole 131, leakage to the outside is prevented by the transparent tape 132 formed outside the detection hole 131, and it moves back to an interior of the lower plate 126 by pressure of the transparent tape 132. Accordingly, as illustrated in FIG. 6A and FIG. 6B (FIG. 6B illustrating a cross-sectional view taken along a line b-b' of FIG. 6A), the resin composition may be evenly spread not only at a portion that is adjacent to the detection hole 131, but also at a portion that is further away from the detection hole 131 and to an end portion of the lower plate 126. In addition, the resin layer 140 formed thereby is formed to fill the interior of the detection hole 131 and to contact the transparent tape 132 as illustrated in FIG. 6B.

On the other hand, as illustrated in FIG. 7, in the case of having only the detection hole 131 in a form of a hole formed in the lower plate 126 instead of a form of the transparent window 130, even when the resin composition is observed in the detection hole 131 and the injection is stopped, the resin composition is distributed only in a portion close to the detection hole 131, and does not reach a portion spaced from the detection hole 131. As a result, a portion in which the resin layer 140 is not formed exists, and sufficient cooling performance for the battery module 100 may not be obtained. In addition, as in the present exemplary embodiment as shown in FIG. 6, in a configuration of FIG. 7, when an injection amount is increased to diffuse the resin composition to the end portion of the lower plate 126, the resin composition overflows through the detection hole 131 so that the raw resin composition is wasted, and an additional process is needed to remove the overflowed resin composition.

As described above, according to the present exemplary embodiment, it is possible to sufficiently inject the resin composition until the resin composition is uniformly dispersed throughout an entire interior of the lower plate 126 while preventing leakage of the resin composition by including the coloring material in the resin composition and monitoring the diffusion of the resin composition with the transparent window 130 made of the detection hole 131 and the transparent tape 132 for blocking it in the process of injecting the resin composition for forming the resin layer 140 inside the module frame 120. Accordingly, it is possible to prevent the waste of a raw material resin composition due to a leakage of the resin composition and the occurrence of an additional process for removing it, and also, excellent cooling performance of the battery module 100 may be secured by uniformly injecting the resin composition into the module case 120.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope greater than or equal to appended claims.

DESCRIPTION OF SYMBOLS

100: battery module
110: battery cell stack
120: module frame
140: resin layer
130: transparent window

The invention claimed is:
1. A battery module comprising:
a module frame including a lower plate and a side wall defining an internal space;
a battery cell stack disposed in the internal space of the module frame and including a plurality of battery cells that are stacked to be adjacent to each other side by side; and a resin layer disposed between the lower plate and the battery cell stack and including a detection agent, wherein the lower plate includes at least one injection hole, and wherein the detection agent is a contrast agent detectable through a solid portion of the lower plate without an optical observation of the resin layer.

2. The battery module of claim 1, wherein
the resin layer includes a thermally conductive resin.

3. The battery module of claim 1, wherein
the contrast agent is comprised of a plurality of particles.

4. The battery module of claim 3, wherein
each of the particles of the plurality of particles is comprised of a compound or a complex containing a metal.

5. The battery module of claim 4, wherein
the metal is lead, barium, or gadolinium.

6. The battery module of claim 3, wherein
each of the particles of the plurality of particles has a diameter of 0.001 μm to 80 μm.

7. A battery pack comprising:
at least one battery module according to claim 1;
a pack case configured to package the at least one battery module.

8. A device comprising:
at least one battery pack according to claim 7.

* * * * *